No. 858,425. PATENTED JULY 2, 1907.
N. W. STORER.
METHOD OF CONTROL FOR ELECTRIC MOTORS.
APPLICATION FILED JULY 24, 1905.
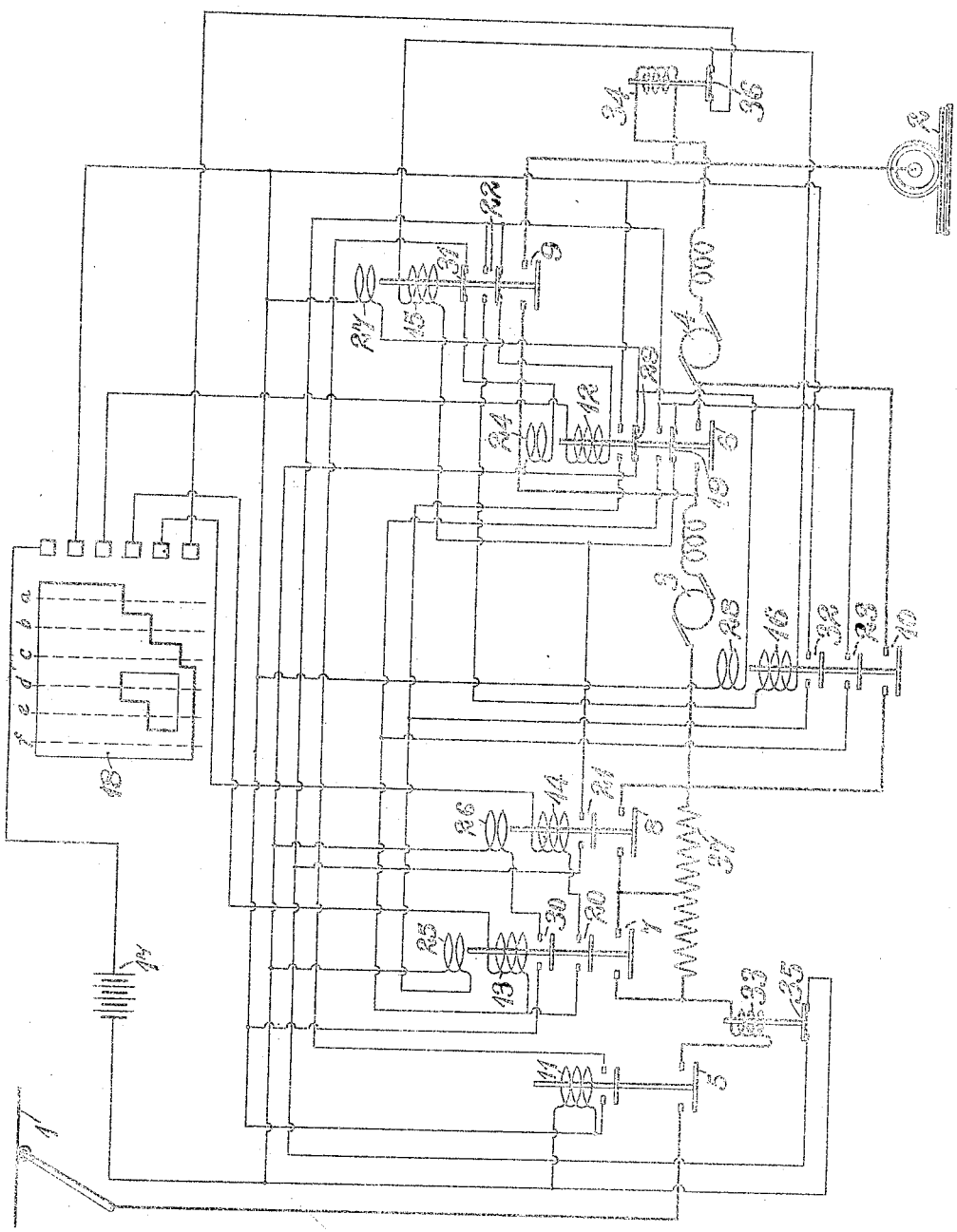
WITNESSES:
Fred. H. Miller
Otto S. Schairer
INVENTOR
Norman W. Storer
BY
ATTORNEY

UNITED STATES PATENT OFFICE.

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF CONTROL FOR ELECTRIC MOTORS.

No. 858,425. Specification of Letters Patent. Patented July 2, 1907.

Application filed July 24, 1905. Serial No. 271,057.

*To all whom it may concern:*

Be it known that I, NORMAN W. STORER, a citizen of the United States, and a resident of Pittsburg, in the county of Allegheny and State of Pennsylvania, have invented a new and useful Improvement in Methods of Control for Electric Motors, of which the following is a specification.

My invention relates to methods of control for electric motors, and it has for its object to provide a method whereby the efficiency of operation of the system which supplies energy to the motors may be greatly improved.

In practicing the series-parallel method of control of electric motors, the motors have usually been accelerated at a substantially constant rate until full voltage was applied to them. The result has been that each motor has been supplied with the same average amount of current whether the motors were connected in series or in parallel relation. Under these conditions, twice as much current has been supplied to a car having two motors when the motors were connected in parallel relation as has been supplied when the motors were connected in series. Since it is the maximum amount of current that must be delivered which determines the capacity of many stations, it is evidently desirable to limit the fluctuations in the amount of current required to the minimum which will permit of fulfilment of the required service conditions. This is particularly desirable in railway systems that operate a small number of cars, only one of which may, perhaps, be applied at a time by any sub-station.

In the practice of my invention, the average amount of current supplied to a car during acceleration may be maintained substantially constant and may be prevented from exceeding a predetermined amount whether the motors are connected in series or in parallel, thereby preventing extreme fluctuations in the amount of current that must be delivered by a sub-station.

While my method may be practiced in all systems of control in which the circuit relations of the motors may be changed, it is most advantageously practiced in systems in which the operation of a plurality of switches located in the motor circuits may be governed by means of a master switch and in which the switches operate successively and automatically as the motors accelerate in speed, the rate of acceleration being dependent upon the amount of current traversing the motor circuits. The switches in such systems are usually provided with magnet windings, which serve, directly or indirectly, to maintain the switches in closed circuit positions after they have once been closed. It is in connection with such a system that I shall explain my invention.

Means have heretofore been provided for preventing further operation of the motor-controlling switches when the current supplied to the motors exceeds a predetermined amount, such means comprising a limit switch the controlling magnet winding of which is connected in circuit with both of the motors, while the motors are connected in series, and in circuit with only one of the motors when the motors are connected in parallel. Under ordinary conditions, such means have served only to limit the amount of current which may be supplied to one of the motors when the motors are connected in parallel and, consequently, in the use of such systems, twice as much current may be supplied to a car when the motors are connected in parallel as when they are connected in series. In the employment of my invention in connection with such a system, a limit switch is provided, the controlling magnet winding of which is always connected in circuit with both of the motors and serves to limit the current that may be supplied to the motors to substantially the same amount, whether they are connected in series or in parallel.

In the practice of the ordinary series-parallel method of control, the amount of current supplied to the motors may increase greatly when the motors are changed from series to parallel relations, and my method contemplates further the prevention of a change in the circuit relations of the motors until they have attained such a speed, while connected in series, that the amount of current which will ordinarily be supplied to them immediately after being connected in parallel will not exceed the predetermined maximum amount.

The single figure of the accompanying drawing is a diagram of a system embodying my invention.

Energy may be supplied from a trolley conductor 1 and a track rail 2 to motors 3 and 4, the circuit conditions and connections of which are governed by means of switches 5, 6, 7, 8, 9 and 10. Switches 5 to 10, inclusive, are provided with operating or controlling magnet windings 11, 12, 13, 14, 15 and 16, respectively, which are adapted to be supplied with energy from any suitable source, such as a battery 17. The circuits of the operating or controlling magnet windings are governed, primarily, by means of a master switch 18 and, secondarily, by means of interlocking switches 19, 20, 21, 22 and 23, which insure closure of the switches in a predetermined order. The switches 6 to 10, inclusive, are also provided with retaining magnet windings 24, 25, 26, 27 and 28, which serve to retain the switches in their closed-circuit positions, after they have once been moved to those positions, regardless of whether or not the operating magnet windings remain energized.

The circuits of the retaining magnet windings are governed, primarily, by the master switch 18 and, secondarily, by means of interlocking switches 29, 30, 31 and 32 that are operated, respectively, by means of switches 6, 7, 9 and 10 and that serve to insure energizing of the retaining magnet windings in a predetermined order.

Permanently connected in circuit with the motors, are magnet windings 33 and 34 that control the operation of switches 35 and 36, respectively. The switch 35 is located in the circuit with the operating magnet windings of switches 6 to 10, inclusive, and is adapted to be opened when the current supplied to the motors exceeds a predetermined amount, regardless of whether the motors are connected in series or in parallel relation.

The switch 36 is located in the circuit of the controlling magnet windings 15 and 16 and, when open, prevents closing of the switches 9 and 10 for the purpose of connecting the motors in parallel relation. The amount of current at which the switch 36 may be set to open should be less than that at which the switch 35 will operate, in order that current may not be supplied to the motors immediately after being connected in parallel in excess of the predetermined maximum amount. During acceleration, the switch 36 will in most cases remain open except for a period of sufficient duration to permit closing of the switches 9 and 10, which are then maintained in closed positions by the magnet windings 27 and 28.

The function that is performed by the switch 36 of delaying operation of the switches which connect the motors in parallel until the current supplied has fallen below a predetermined amount, may also be served by a dash-pot (not shown) attached to the switch 9, or any other suitable means may be employed for this purpose.

In the operation of the system, the master switch 18 is first moved to position $a$ and the switches 5 and 6 close, thus connecting the motors in series with each other and with a resistance 37. If the master switch is moved to position $b$, the switch 7 will close and a portion of the resistance 37 will be shunted. If the master switch is moved to position $c$, switch 8 will close and the remaining portion of the resistance 37 will be shunted. If the master switch is moved to position $d$, switch 9 will close, switches 6, 7 and 8 will open and switch 10 will close and the motors will then be connected in parallel with the resistance 37 in circuit. If the master switch is moved to positions $e$ and $f$, the switches 7 and 8 will close in succession and the resistance 37 will be shunted.

If the master switch is moved directly to the position $c$, the switches will close automatically, in the order previously stated, until the motors are connected in series with no resistance in the circuit, and if the master switch is then moved to the position $f$, the switches will close automatically, in the order previously stated, until the motors are connected in parallel relation with no resistance in circuit, the order of closure of the switches being governed by means of the interlocking switches. If the master switch is moved directly to position $f$, the switches will close automatically in the proper order until the motors are connected in full parallel relation.

Since the details of operation of the system and the specific functions of the interlocking switches form no part of my present invention, and since the system operates, in most respects, in a manner substantially similar to that described in Patent No. 773,833, granted November 1, 1904, to George Westinghouse, upon an application filed by George Westinghouse and Louis M. Aspinwall, I deem it unnecessary to describe the control circuits more particularly.

When the switch 35 is open, the circuits of the operating magnet windings of the switches 6 to 10, inclusive, are open, while one or more of the retaining magnet windings 24 to 28, inclusive, may be energized and thus maintain the circuit conditions as they were previous to opening of the switch 35. Normal operation of the system may be resumed only after the current delivered to the motors has fallen below the predetermined amount which caused the switch 35 to open. As before described, the switches 9 and 10 which connect the motors cannot be closed while the switch 36 is open; that is, while the current supplied to the motors when connected in series exceeds a predetermined amount less than the predetermined amount which will cause the switch 35 to open.

While I have shown my invention as practiced in a system of control for two motors, it will be understood that it may also be applied to systems of control for four or more motors, in which the number, construction and arrangement of the control switches and the circuits therefor may be modified, within reasonable limits, to meet the conditions imposed by the employment of a greater number of motors or otherwise. By suitable modifications of the governing circuits, my invention may also be practiced in combination with any other means for effecting changes in the circuit relations of the motors, such as a drum form of controller.

I claim as my invention:

1. The method of operating a plurality of electric motors which consists in connecting them first in series relation and then in parallel relation, and limiting the amount of current taken from the supply circuit to substantially the same maximum for parallel operation as that required for series operation of the motors.

2. The method of operating a plurality of electric motors which consists in connecting them first in series relation and then in parallel relation, and limiting the amount of current taken by all of the motors when connected in parallel to a maximum that does not materially exceed the maximum current taken by the motors when connected in series.

3. The method of operating a plurality of electric motors which consists in connecting them first in series relation and then in parallel relation, preventing the current supplied to all of the motors when connected in series from exceeding a predetermined amount and preventing a change in the circuit relations of the motors from series to parallel when the current supplied to all of the motors exceeds a predetermined amount less than the aforesaid predetermined amount.

4. The method of operating a plurality of electric motors which consists in first connecting them in series relation and then in parallel, preventing the current supplied to the motors from exceeding a predetermined amount regardless of their circuit relations, and preventing a change in the circuit relations of the motors from series to parallel when the current exceeds a predetermined amount less than the aforesaid predetermined amount.

5. The method of operating a plurality of motors which consists in successively connecting them in series relation and in parallel relation and in limiting the current taken from the supply circuit to substantially the same maximum for both relations of the motors.

6. The method of operating a plurality of electric motors which consists in adjusting the circuit relations thereof, and limiting the amount of current taken from the supply circuit to substantially the same maximum for all of the circuit relations of the motors.

In testimony whereof, I have hereunto subscribed my name this 18th day of July, 1905.

NORMAN W. STORER.

Witnesses:
F. E. WYNNE,
BIRNEY HINES.